United States Patent [19]

Wood

[11] Patent Number: 4,689,816

[45] Date of Patent: Aug. 25, 1987

[54] THREE RELAY C. O. TRUNK INTERFACE

[75] Inventor: Samuel F. Wood, Los Altos Hills, Calif.

[73] Assignee: D.A.V.I.D. Systems, Inc., Sunnyvale, Calif.

[21] Appl. No.: 691,999

[22] Filed: Jan. 15, 1985

[51] Int. Cl.[4] .................. H04M 3/22; H04M 7/14
[52] U.S. Cl. ................................ 379/382; 379/240
[58] Field of Search ........ 179/18 AH, 18 FA, 18 AB, 179/18 AD, 18 HB, 84 A

[56] References Cited

U.S. PATENT DOCUMENTS

| 4,310,725 | 1/1982 | Mehaffey | 179/18 AH |
| 4,326,104 | 4/1982 | Bergida | 179/16 AA |
| 4,361,732 | 11/1982 | Wood | 179/18 AH |
| 4,398,064 | 8/1983 | Formosa, Jr. | 179/18 AH |
| 4,431,868 | 2/1984 | Bolus et al. | 179/18 FA |
| 4,535,201 | 8/1985 | Kasbia et al. | 179/18 FA |
| 4,540,852 | 9/1985 | Albouy et al. | 179/18 FA |

Primary Examiner—Thomas W. Brown
Attorney, Agent, or Firm—Townsend and Townsend

[57] ABSTRACT

An interface system having a single detector to detect incoming signalling including ringing, tip ground, forward loop current, and reverse loop current. Relays and bias control are utilized to perform outgoing signalling and for configuring the system to defect the various incoming signalling states with a single detector.

10 Claims, 10 Drawing Figures

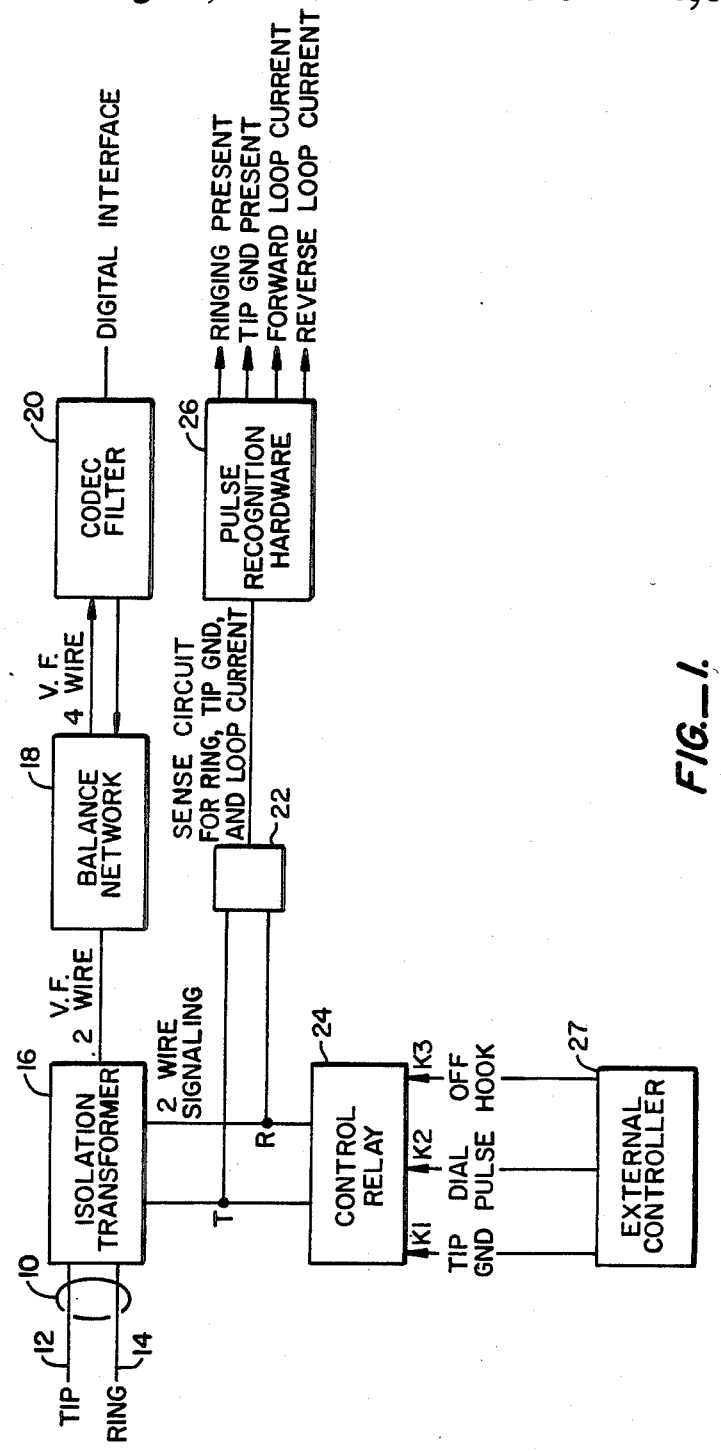
FIG._1.

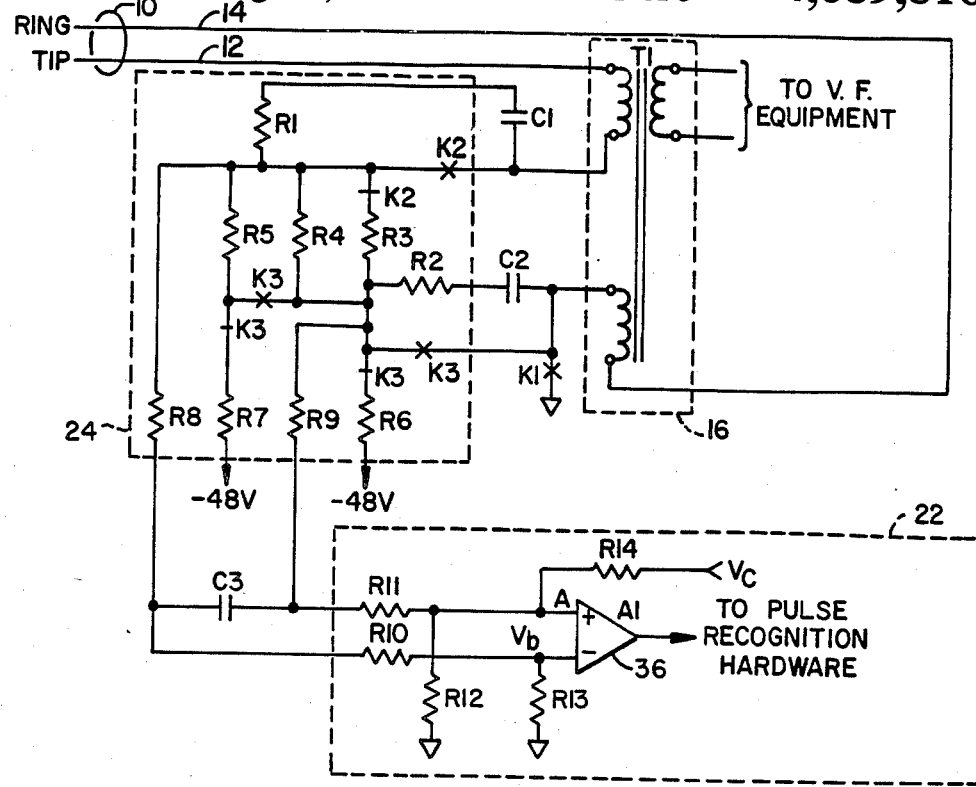
FIG._2.
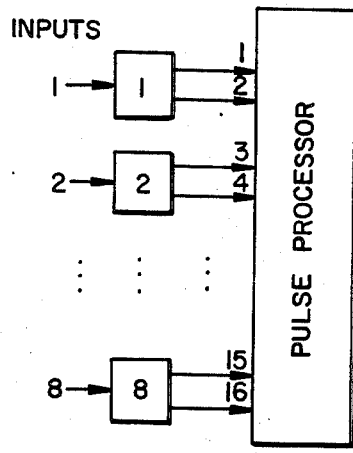
FIG._6A.
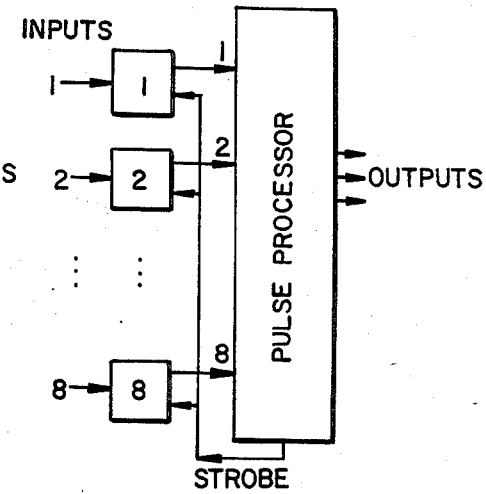
FIG._6B.

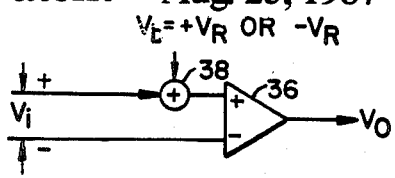
FIG._3A.
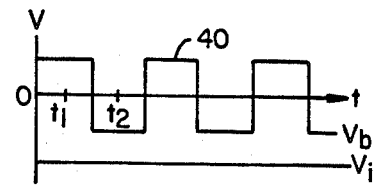
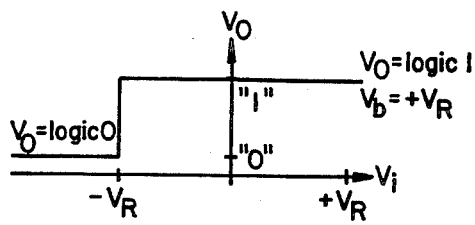
FIG._3B.
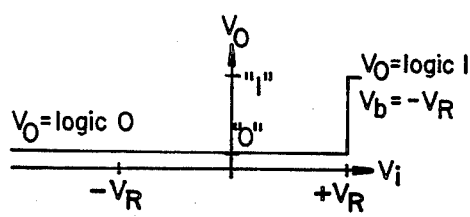
FIG._3C.
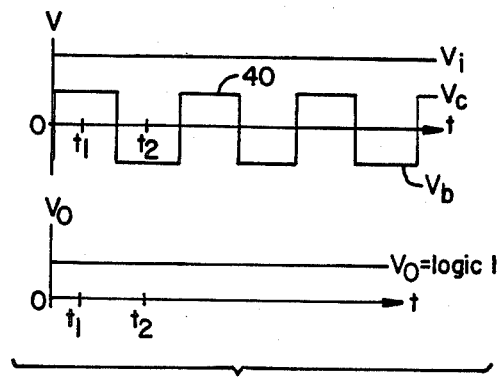
FIG._5A.
FIG._5B.
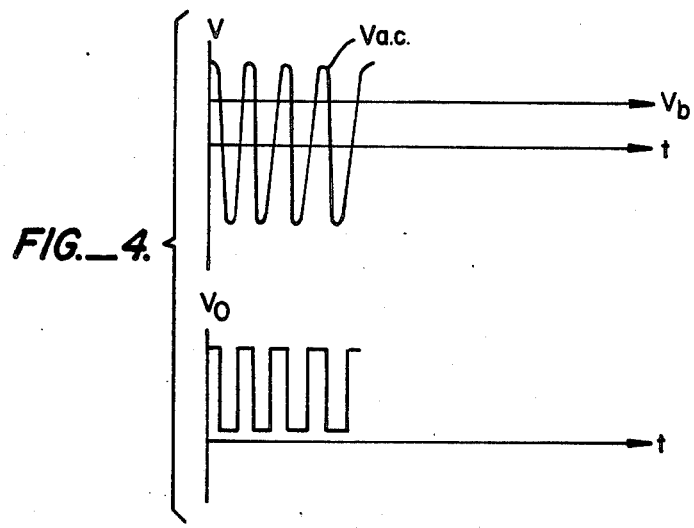
FIG._4.

THREE RELAY C. O. TRUNK INTERFACE

BACKGROUND OF THE INVENTION

1. Field of the Invention

This invention relates generally to interface circuits for use in telephone systems and more particularly to a trunk interface circuit between a PABX or central office (C.O.) and a two line trunk circuit.

2. Description of the Prior Art

In a telephone network, trunks are used to provide links between various telephone switching facilities. In the case of a two-wire trunk, used for example between a private branch exchange (PABX) and a central office, a PABX trunk interface circuit and a C.O. trunk interface circuit are used to provide termination for the trunk. One of the wires in the two-wire trunk is designated tip and the other is designated ring.

The trunk interface contains signaling circuitry—for performing outgoing signalling including off-hook, ring ground, and dialing, and for receiving incoming signalling including ringing, tip ground, and forward and reverse loop current; transmission circuitry—for the transmission and reception of audio signals, i.e., the circuits that carry our voices; and isolation circuitry—for electrically isolating the PABX from the central office.

Many existing systems used separate relays and detectors for each function. These designs were expensive because a separate detector circuit was provided for each function. Circuits were provided for ringing detection, tip ground detection, forward current detection, and reverse current detection. Relays were provided for signalling ring ground, off hook, and dialing.

In U.S. Pat. No. 4,361,732, by the present inventor, an improved interface circuit reduced the number of detector circuits to two by using relays to switch the detectors.

The interface circuits reflect per line expenses and, thus, any increase in the costs of an interface is multiplied by the number of lines utilized by a customer. The cost of these extra detectors and associated circuitry thus becomes a significant cost to the customer. Additionally, a system utilizing two detectors to sense loop current directions presents two output signals which must be processed, thereby further increasing the cost per line of prior art systems.

SUMMARY OF THE INVENTION

In the present invention a single detector is utilized to detect the presence of ringing, tip ground, forward loop current, and reverse loop current. The ability to detect these varying trunk states is accomplished by utilizing the techniques of relay switching and bias control. A similar system that does not detect tip ground is disclosed in copending, commonly assigned, patent application Ser. No. 06/665,681.

Detection is accomplished through the use of a comparator which compares input signal, $V_i$, with a reference bias voltage $V_b$ equal to $+V_R$ or $-V_R$. The comparator produces an output voltage representative of logic 1 if the algebraic sum of $V_i$ and $V_b$ is greater than zero volts, and of logic 0 if the the aforementioned sum is less than zero volts.

In one embodiment of the present system, detection of forward and reverse loop current by a single detector is accomplished as follows. The input voltage signal is developed across a loop current sensing resistive network through which the loop current flows. The polarity of the input voltage signal will thus be determined by the direction of current flow. The bias voltage to the comparator is provided by a separate control voltage source, $V_c$. The input voltage and the bias voltage are provided to the comparator through a resistive voltage dividing network. For loop current detection, the bias voltage is switched between plus and minus $V_R$. The loop current sensing resistive network and the voltage dividing resistive network are designed so that the input voltage generated across the loop current sensing resistive network is of greater magnitude than the absolute value of the reference voltage, $V_b$. By sampling the comparator output signal at each bias point, output samples referenced to two different thresholds are obtained. By comparing the state of the comparator output signal, $V_O$ (representing logic 0 or 1), with the polarity of the reference voltage, $V_b$, the input voltage polarity state is determined, thus, in turn, determining the direction of loop current flow.

A ringing signal is detected by the same detector utilized for detecting forward and reverse loop current or battery state as follows. Ringing is a 20 Hz A.C. voltage applied across the tip and ring in the on-hook state. The voltage is capacitively coupled to a ringing sensing resistive network configured to generate a ringing signal input voltage state. The ringing sensing resistive network and the resistive voltage dividing network are designed so that the input voltage state for the ringing signal has a peak magnitude greater than the bias voltage state applied to the comparator. When the telephone is in the on-hook state the comparator bias voltage, $V_b$, is positive. The negative peaks of the incoming ringing signal will overcome the bias, $V_b$, and will appear at the comparator output, $V_O$, as a series of logic 0 pulses. These pulses will be detected when $V_O$ is sampled and referenced to the bias voltage polarity state.

Tip ground is also detected by the same detector utilized to detect other incoming signalling. A tip ground sensing resistive network is connected between the tip side of trunk and a negative 48 volts terminal by relay contacts. The comparator is biased so that current flowing through the tip ground resistive network to ground creates a voltage, $V_i$, of greater magnitude and opposite polarity form $V_b$ so that the state of $V_O$ changes, thereby indicating presence of tip ground.

Outgoing signalling including loop closure, ring ground, and dialing is accomplished utilizing the same relays that configure the system for detecting incoming signalling.

BRIEF DESCRIPTION OF THE DRAWINGS

FIG. 1 is a block diagram of the present invention.

FIG. 2 is a circuit diagram of an embodiment utilizing two relays.

FIG. 3A is a schematic diagram of an op amp comparator.

FIGS. 3B and 3C are graphs depicting the output of the op amp comparator as a function of its inputs.

FIG. 4 is a set of graphs depicting the inputs and outputs of the op amp comparator in a ringing signal detection mode.

FIG. 5A and 5B are graphs depicting the inputs and outputs of the op amp comparator in a loop current detection mode.

FIG. 6A is a schematic diagram depicting a typical circuit pack configuration for detecting signalling.

FIG. 6B depicts a circuit pack configuration utilizing the principles of the present invention.

DETAILED DESCRIPTION OF THE PREFERRED EMBODIMENTS

The present invention is an interface circuit connecting a PABX to a C.O. trunk.

Referring now to FIG. 1, a block diagram of a system including an interface circuit between a trunk line circuit and a telephone facility is depicted. In FIG. 1, a trunk line circuit 10 includes tip and ring lines 12 and 14, respectively. The following discussion will relate to an interface between a central office trunk line circuit and a PABX to simplify the following description of the invention. However, it is to be understood that the interface may be utilized between a two line trunk circuit and any telephone facility. The C.O. line circuit 10 connects each PABX to a central office that contains switching equipment, signaling equipment, and batteries that supply direct current to operate telephone sets. An isolation transformer 16 provides isolation from common mode signals on the local loop. The balance network and codec filter 18 and 20 are standard elements of an electronic telephone set and will not be described herein. The lines are interconnected to a detector 22 for sensing incoming signals including a ringing signal, tip ground, forward loop current, and reverse loop current. The interconnection of the lines with the sensor 22 is controlled by a relay 24. The control relays configure the system to receive incoming signals and also are utilized to perform outgoing signalling including loop closure, ring ground, and dialing. The output signal from detector 22 is processed by the pulse recognition hardware 26 which analyzes the detector output signal to determine whether a ringing signal, tip ground, forward loop current, or reverse loop current is present in the C.O. line circuit 10. An external controller 27 provides the relay control signals. The pulse recognition hardware 26 and controller 27 may be realized by a single processor.

In one embodiment, the detector 22 includes a singal operational amplifier with a bias control circuit and a relay controlled resistive/capacitive network to allow for the sensing of ringing, tip ground, forward loop current, or reverse loop current utilizing the single operational amplifier.

FIG. 2 is a circuit diagram depicting a preferred embodiment of the present invention. The circuit in FIG. 2 includes relay contacts K1, K2, K3 for configuring the circuit to perform outgoing signalling including loop closure, ring ground, and dialing and for configuring the circuit to receive incoming signalling including ringing, tip ground, and forward and reverse battery state. A control voltage terminal provides a control voltage, $V_C$, for controlling the bias voltage, $V_b$, at the inputs of a comparator. The control voltage level, $V_C$, is set at either a high or low state. The relays K1, K2, and K3 are selectively energized to close make contacts and open break contacts. The system assumes various states, termed IDLE, BUSY TEST, RING GND, SEIZE TEST, OFF HOOK, and DIALING, determined by which relays are energized and the level of $V_C$. Table 1 sets forth the circuit configurations for the various system states where "1" indicates energized relays and a "0" indicates de-energized relays.

TABLE 1

| State | OUTGOING DRIVE | | | INPUT SENSE | |
|---|---|---|---|---|---|
| | K1 | K2 | K3 | VC = high | VC = low |
| IDLE | 0 | 0 | 0 | ringing | — |
| BUSY TEST | 0 | 1 | 0 | tip GND | — |
| RING GND | 1 | 1 | 0 | tip GND | — |
| SEIZE TEST | 1 | 1 | 1 | forward loop current | reverse current |
| OFF HOOK | 0 | 1 | 1 | forward loop current | reverse current |
| DIALING | 0 | 0 | 1 | — | — |

The following is a brief description of each state, a more detailed description follows the description of FIGS. 3A-C:

IDLE: In the idle state, the trunk interface appears to the C.O. as a loop start trunk. All relays are de-energized, and tip and ring 12 and 14 of the line 10 are AC coupled to the detect circuitry through C1 and C2.

BUSY TEST: This state is used to test for presence of tip ground. K2 is energized and the comparator detects tip ground.

RING GND: This state provides a ground on the ring side 14 of the line 10 through K1, and senses tip ground through K2.

SEIZE TEST: Tests the trunk by grounding both tip and ring 12 and 14. Used for checking for incorrect trunk wiring.

OFF HOOK: K2 and K3 are energized. Forward or reverse loop current may be detected. This state is used as the normal talking state for the trunk.

DIALING: Dialing is performed by momentarily de-energizing the K2 relay in the off hook state. While the relay is de-energized no signalling detection is done.

The input signals for selectively energizing the various relays are supplied from the external controller 27 according to predetermined protocol. The controller 27 may be either the same one detecting the signals or a separate processor. The source of the signals is not part of the present invention.

To better understand the invention, a brief description of the operation of a comparator is included with reference to FIGS. 3A, 3B, and 3C. In FIG. 3A, $V_i$ represents an input voltage developed across either R3, R4, or R5. The point A in the circuit depicted in FIG. 2 is represented, logically, by an adder 38. The bias voltage, $V_b$, and the input voltage, $V_i$, are algebraically summed at the adder 38 and this summed voltage is applied to the inputs of the comparator 36. $V_O$ indicates the output signal of the operational amp 36 responsive to a given bias voltage and input voltage. The comparator produces an output voltage representative of logic 1 if the algebraic sum of $V_i$ and $V_b$ is greater than zero volts, and of logic 0 if the aforementioned sum is less than zero volts. It is to be understood that the invention does not depend on any particular configuration of the comparator circuit and that the description which follows is merely intended to facilitate the understanding of the invention and places no limitation on the various comparator circuits which could be utilized to implement the amplitude detection function of the present invention.

Referring now to FIG. 3B, a graph of the output signal $V_O$ as a function the input voltage, $V_i$, and the bias voltage, $V_b$, when the bias voltage is equal to $+V_R$ is depicted. Note that for a positive input voltage the output signal from the comparator $V_O$ is representative of a logic 1. However, when the input voltage, $V_i$, exceeds the magnitude of $V_R$ and is of opposite polarity than the bias voltage, the output signal swings to a value representative of logic 0. Thus an input signal of opposite polarity and greater magnitude than $V_b$ can be detected by comparing the logic state of $V_O$ with the polarity of the reference voltage. Similarly, FIG. 3C depicts the output voltage of the comparator when $V_b$ is equal to $-V_R$. Note that for a negative input voltage the output signal $V_O$ is representative of logic 0. However, when $V_i$ is of opposite polarity from $V_b$ and exceeds the magnitude of $V_R$, the output signal, $V_O$, becomes a logic 1. Thus, when the bias voltage is equal to negative $V_R$, an input signal of opposite polarity and greater than the magnitude of $V_b$ may be detected.

Referring back to FIG. 2, the circuit includes a ringing sensing resistive network, a tip ground sensing resistive network, and a loop current sensing resistive network comprising resistors R3, R4, and R5 respectively. These resistors are A.C. coupled to the tip and ring lines 12 and 14 through the first winding of the isolation transformer T1 by capacitors C1 and C2 and resistor R2. The tip and ring lines 12 and 14 may also be directly coupled to the circuit by energizing selected relays. The input voltage, $V_i$, developed across a selected resistive network is directed to the inputs of an op amp comparator 36 by a resistive voltage dividing network comprising resistors R8, R10, and R13 tied to ground, and R9, R11, and R12 tied to ground, and capacitor C3. The bias voltage, $V_b$, is provided through bias voltage control input, $V_C$, and resistor R14. A negative 48 volt terminal is connected to the circuit by parallel resistors R7 and R6.

In a preferred embodiment a model MC 1458 op amp is utilized and the circuit elements depicted in FIG. 2 have the following values:

| R1 | 620 Ω | R10 | 402 kΩ |
| --- | --- | --- | --- |
| R2 | 620 Ω | R11 | 402 kΩ |
| R3 | 2.7 kΩ | R12 | 20.5 kΩ |
| R4 | 5.1 kΩ | R13 | 20 kΩ |
| R5 | 200 Ω | R14 | 887 kΩ |
| R6 | 36 kΩ | C1 | .68 μf |
| R7 | 36 kΩ | C2 | .68 μf |
| R8 | 100 kΩ | C3 | .047 μf |
| R9 | 100 kΩ | | |

The operation of the circuit depicted in FIG. 2 to detect the various incoming states will now be described. Ringing is detected during the IDLE state. In this state, relays K1, K2, and K3 are de-energized. The negative input of the op amp comparator 36 has a small negative voltage coming from the $-48$ volt terminal through a voltage divider consisting of R7, R5, R8 and R10 in series, and R13 to ground. The positive input is biased to $V_b = +V_R$ through a voltage divider consisting of R6, R9, R11 in series, R12 to ground, and R14 to $V_C$. Because R14 is connected to $V_C$ and R6=R7, R8=R9, R10=R11, and R12=R13, $V_i$ is 0, $V_b$ is greater than 0, and $V_O$ is a logic 1.

Ringing from the C.O. will appear as a 20 Hz sine wave on the ring side of the line with the tip side connected to ground. The ringing current flows from the ring side 14 through T1, C2, R2, R3, K2, R1, C1, and T1 to the tip side 12 of the line 10. The AC voltage across R3 is detected by the op amp comparator 36 through R8 and R9 with C3 used as a transient filter. Incoming ringing shows up at the output of the op amp comparator 36 as a series of logic 0 pulses on $V_O$. The pulses on $V_O$ are timed and counted to provide controls on the acceptable ringing frequency and amplitude in the pulse recognition hardware. The bias resistor, R14, provides a minimum detection threshold for ringing pulses. The detection of ringing is illustrated in FIG. 4.

Tip ground is detected when the system is configured in the BUSY TEST state with K2 energized, K1 and K3 de-energized, and $V_C$ high. If the tip side of the line is open, and K2 is energized, the tip side of the line will be pulled to $-48$ volts through R5+R7 in parallel with R4+R6. In this state, both sides of R4 are at $-48$ volts and if $V_C$ is high, then $V_O$ indicates logic 1. If the tip is grounded, then current will flow through the beforementioned resistors producing a voltage across R4. This voltage is detected through R8 and R9. The voltage at the junction of R9 and R4 will be more negative than the voltage at the junction of R8 and R4 thereby providing a negative input voltage, $V_i$. When the current through R4 is of sufficient magnitude, the bias due to $V_C$ and R14 will be overcome, and $V_O$ will indicate logic 0.

In FIGS. 5A and 5B the technique for utilizing a single operational amplifier comparator circuit to detect both forward and reverse loop current is described. Referring to FIG. 5A, the bias voltage is introduced to the op amp 36 through R14 and $V_C$. This bias voltage sets the trigger voltage of the op amp comparator circuit as described above with reference to FIGS. 3A through 3C. The control voltage level, $V_C$, is switched between $+5$ and $-5$ volts as depicted in the graph. This causes the bias voltage, $V_b$, to switch between $+0.012$ and $-0.012$ volts at the comparator input terminals. Thus, the bias voltage at the input terminals is in the form of a square wave 40 of a predetermined period as depicted in FIG. 5A.

Turning now to the detection of forward loop current, the relays K2 and K3 are energized and K1 is de-energized when the circuit is in the OFF HOOK state. The C.O. line circuit 10 is in the forward battery state, i.e., the tip is positive with respect to the ring. Current flows from tip 12 through T1, K2, R5, K3, T1 to ring 14 developing an input voltage, $V_i$, across R5. This voltage drop is directed to the input terminals of the op amp comparator 36 by the resistive voltage dividing network and appears as a negative input voltage, $V_i$, across these terminals. The magnitude of R5 is selected so that the input voltage signal will have a greater magnitude than the bias voltage, $V_b$.

In FIG. 5A the bias voltage $V_b$ is equal to $+V_R$ at time $t_1$ and $-V_R$ at time $t_2$. The output voltage is equal to logic 0 at time $t_1$ since the magnitude of $V_i$ is of greater magnitude and of opposite polarity from $V_b$. Thus, if the output state is sampled at time $t_1$ and is found to be logic 0, this indicates that $V_i$ is of opposite polarity from $V_b$ and that forward loop current is flowing through the loop current sensing resistive network comprised of R5. At time $t_2$ the bias voltage is negative and the output is logic 0 even if no forward loop current is flowing. Thus, only at time $t_1$ and at other times when the voltage bias is positive may forward loop current be detected by the output voltage from the comparator.

Similarly, in FIG. 5B, if reverse loop current is flowing through the R5, then the state of $V_O$, the comparator output signal, will be 1 at time $t_2$, thereby indicating that reverse loop current is flowing in the loop.

Accordingly, by switching the polarity of the bias voltage, sampling the output voltage to determine its state and comparing the output voltage state to the polarity of the bias voltage at the time of sampling the presence of forward and reverse loop current may be unambiguously detected.

The operation of the circuit to perform outgoing signalling will now be described.

In the OFF HOOK state, loop closure occurs as described above, in the description referring to FIG. 5 and explaining the detection of forward or reverse loop current, because a direct circuit between tip and ring is provided by energizing K2.

In the RING GROUND state, K1 is energized to ground the ring line 14. Note that K2 is also energized so that the C.O. acknowledgement of seizure of the trunk by grounding the tip is detected as set forth above for tip ground detection.

Dialing is performed by momentarily de-energizing the K2 relay in the OFF HOOK state.

The pulse recognition circuitry 26 in FIG. 1 includes a microprocessor programmed to control the level of $V_C$ according to whether the detection of the ringing signal, tip ground, or forward and reverse loop current is being implemented, for sampling the output signal from the comparator 22, for comparing the comparator output state to the bias voltage polarity state, and for indicating the presence of a ringing signal, tip ground, or forward and reverse loop current. The implementation of the pulse recognition circuitry utilizes standard techniques well known in the art and is not part of the present invention.

FIGS. 6A and 6B illustrate an important advantage of the present invention. In FIG. 6A a typical 8 channel circuit pack requiring 16 pulse-processor input ports to detect signalling from an interface utilizing two detectors per C.O. line appearance is illustrated. In FIG. 6B, a system utilizing the present invention is illustrated. Only 8 input ports are required with an output strobe, for switching $V_C$, common to all 8 channels.

Alternative circuitry for accomplishing the functions of the circuits described with reference to FIGS. 2 and 6 may be utilized to implement the invention. For example, any comparator circuit that can operate with two or more different thresholds may be substituted for the comparator described above. Accordingly, the scope and breadth of the present invention is defined by the appended claims.

What is claimed is:

1. An interface system connecting a trunk line circuit, of the type including a tip-ring line pair, and a telephone facility comprising:
   a single detector for detecting an input signal being either a ringing signal, a tip ground signal, forward loop current signal, or a reverse a loop current signal incoming to said telephone facility, and for generating a detector output signal being in either a first or second output state; and
   means, adapted to receive said detector output signal, for determining which one of said input signals has been detected.

2. The invention of claim 1 wherein said single detector comprises:
   means for generating an input voltage state;
   means for generating a bias voltage;
   a comparator for producing an output signal that indicates the presence of an input voltage state of opposite polarity and of greater magnitude than said bias voltage; and
   a resistive voltage dividing network for routing said input voltage state and said bias voltage to said comparator;
   and wherein said determining means selectively controls the level of said bias voltage to be either a first or a second bias voltage state, with said bias voltage states being of opposite polarity.

3. The invention of claim 2 wherein said input voltage state generating means comprises:
   a ringing signal sensing resistive network for providing a ringing signal input voltage state; and
   a loop current sensing resistive network for providing a loop current input voltage state; and
   a tip ground sensing resistive network for providing a tip ground input voltage state.

4. The invention of claim 3 further comprising:
   first coupling means for capacitively coupling said trunk line circuit to said ringing signal sensing resistive network to detect said ringing signal;
   second coupling means for directly coupling said tip line to said tip ground sensing resistive network;
   third coupling means for directly coupling said trunk line circuit to said loop current sensing resistive network to detect forward or reverse loop current; and
   means for selectively activating either said first coupling means, said second coupling means or said third coupling means.

5. The invention of claim 4 further comprising:
   pulse recognition means for sampling the output signal from said comparator to determine whether said ringing signal, tip ground, forward loop current, or reverse loop current is present in said trunk line circuit.

6. The invention of claim 5 wherein:
   said recognition means provides a strobe signal to said means for setting the bias voltage, where said strobe signal causes said bias voltage to switch between said first and second bias voltage states at times $t_1$ and $t_2$, and said pulse recognition means further provides for referencing the sampled comparator output to the bias voltage to determine whether the polarity of the input voltage state is of opposite polarity from said bias voltage at either $t_1$ or $t_2$.

7. The invention of claim 6 wherein said selective activating means comprises:
   a plurality of relay contacts which are selectively energized to configure the system to perform outgoing signalling and to receive incoming signalling from said trunk line circuit.

8. The invention of claim 7 wherein said plurality of relay contacts comprises:
   relay contacts K1, K2, and K3 and wherein:
   said interface system is configured in an IDLE state, when K1, K2, and K3 are de-energized, for detecting said ringing signal;
   said interface system is configured in a BUSY TEST state, when K2 is energized and K1 and K3 are de-energized, for sensing tip ground;
   said interface system is configured in a RING GND state, when K1 and K2 are energized and K3 is de-energized, for signalling ring ground to the trunk line circuit and for detecting tip ground; and said interface system is configured in an OFF HOOK state, when K2 and K3 are energized and K1 is de-energized, for transmitting loop closure tdo said trunk line circuit and for detecting forward or reverse loop current.

9. The invention of claim 8 wherein said bias voltage is in said first bias voltage state when said interface system is configured in said IDLE, BUSY TEST, or RING GND state, or when said system is configured in the OFF HOOK state to detect forward loop current, and wherein said bias voltage is in said second bias voltage state when said interface system is configured in the OFF HOOK state to detect reverse loop current.

10. An interface circuit connecting a two-wire trunk line circuit and a telephone facility, said interface circuit comprising:
a plurality of relay contacts for configuring the interface circuit to perform outgoing signalling and to receive incoming signals, including ringing, tip ground, forward battery state, and reverse battery state;
means for providing input voltage signals indicating the reception of incoming signals;
means for generating a bias voltage being in either a first or a second bias voltage state;
a single comparator for detecting said incoming signals and for generating an output signal being in either a first or a second output state;
means for selectively controlling the level of said bias voltage to be either at said first bias voltage state or at said second bias voltage state, with said first and second bias voltage states being of opposite polarity;
means for directing said input voltage signals and said controlled bias voltage state to the inputs of said comparator; and
means, adapted to receive said output signal, for determining which ones of said input signals have been detected.

* * * * *